(12) United States Patent
Schreter

(10) Patent No.: US 11,442,966 B2
(45) Date of Patent: Sep. 13, 2022

(54) HIGH-PERFORMANCE STATISTICS

(71) Applicant: SAP SE, Walldorf (DE)

(72) Inventor: Ivan Schreter, Malsch (DE)

(73) Assignee: SAP SE, Walldorf (DE)

( * ) Notice: Subject to any disclaimer, the term of this patent is extended or adjusted under 35 U.S.C. 154(b) by 647 days.

(21) Appl. No.: 16/373,383

(22) Filed: Apr. 2, 2019

(65) Prior Publication Data

US 2020/0320107 A1 Oct. 8, 2020

(51) Int. Cl.
*G06F 16/28* (2019.01)
*G06F 16/21* (2019.01)
*G06F 17/18* (2006.01)

(52) U.S. Cl.
CPC ......... *G06F 16/289* (2019.01); *G06F 16/219* (2019.01); *G06F 17/18* (2013.01)

(58) Field of Classification Search
CPC ............................ G06F 16/289; G06F 16/219
See application file for complete search history.

(56) References Cited

U.S. PATENT DOCUMENTS

| | | | |
|---|---|---|---|
| 2005/0149587 A1* | 7/2005 | Bacon | G06F 12/0253 707/999.206 |
| 2012/0159502 A1* | 6/2012 | Levin | G06F 9/5016 718/104 |
| 2015/0149441 A1* | 5/2015 | Nica | G06F 16/24542 707/719 |

* cited by examiner

*Primary Examiner* — Kannan Shanmugasundaram
(74) *Attorney, Agent, or Firm* — Mintz Levin Cohn Ferris Glovsky and Popeo, P.C.

(57) ABSTRACT

A system and method of managing highly-volatile statistics of a multi-threaded application environment. The statistics are represented by one or more statistics objects. Each statistics object of the one or more statistics objects is prefixed with an object header having a version counter with an initial version count of zero. Each statistics object is associated with a statistics class instance, each statistics class instance being associated with an associative registry that is configured to allocate smallest possible objects of a size equal to or greater than to that of the statistics objects, the registry segmenting the statistics objects according to a size class. Each allocated statistics object is constructed in the object frame after the object header. Then, the object header of each allocated statistics object is initialized. Once allocated, objects can be deallocated.

15 Claims, 2 Drawing Sheets

HIGH-PERFORMANCE STATISTICS

TECHNICAL FIELD

The subject matter described herein relates to compiling statistical records of complex computing systems, and more particularly to an associative registry providing highly-volatile statistics efficiently without synchronization.

BACKGROUND

In complex programs, such as multi-threaded applications in a database management system, it is necessary to get qualitative and quantitative insight into the inner workings of the system. In most conventional computing systems, this is typically done by counting various events or measuring transactional times, and storing such information in statistical records in the database. For instance, SAP's HANA® database (DB) extensively uses various statistics records, which are usually exposed as monitoring views in SQL. There are over one hundred various statistic types, with up to millions of records associated with them in the DB. Statistics object registration can be implemented trivially by storing objects or references to them in a traditional data structures, such as a linked list or a tree. However, access to these structures then needs to be synchronized (e.g., via a mutex), which is a program object that is created so that a number of threads of a multi-threaded program can take turns sharing the same resource, such as access to a common file.

Statistics objects can be long-lived (e.g., to indicate I/O performance on an I/O device), where additional synchronization at creation and destruction time is not a problem. However, some statistics objects can be also extremely short-lived (e.g., information about a single micro-operation in an RDMA implementation). In an example, current SAP HANA® DB statistics are already lock-free, but require access to a global lock-free head at allocation time. Further, deallocation of a statistics object is delayed by iterators iterating the statistics. The deallocation algorithm is fairly complex, and leads to various issues with respect to performance. Despite lock-free allocation, current implementations of registering statistics objects are not suitable for high-performance volatile statistics, due to contention at allocation time.

Since some database management systems, such as HANA® DB, now also support asynchronous processing by scheduling micro-operations (e.g., in response to events coming in via RDMA message queues), what is needed is a different, more scalable method for registering statistics, and in particular highly-volatile statistics for a high-performance multi-threaded application, where synchronization between threads is namely prohibitively expensive and needs to be avoided.

SUMMARY

This document describes a system and method to manage highly-volatile statistics efficiently without synchronization, particularly in a high-performance multi-threaded application of a database management system or other computing environment. The described implementation is linearly scalable across cores, as well as extremely fast, so it can be used for separate statistics for each individual micro-operation of a multi-threaded operation, if needed.

In some aspects, a system and method of managing highly-volatile statistics of a multi-threaded application environment are described, where the statistics are represented by one or more statistics objects. In one aspect, a method includes prefixing, to each statistics object of the one or more statistics objects, an object header having a version counter with an initial version count of zero. The method further includes associating each statistics object with a statistics class instance, where each statistics class instance is associated with an associative registry that is configured to allocate smallest possible objects of a size equal to or greater than to that of the statistics objects, the registry segmenting the statistics objects according to a size class. The method further includes constructing each allocated statistics object in the object frame after the object header, and initializing the object header of each allocated statistics object by executing a store/store memory barrier and incrementing the version counter by a count of one to mark the associated allocated statistics object as valid. In some implementations, the statistics can be deallocated, according to methods described herein.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. The claims that follow this disclosure are intended to define the scope of the protected subject matter.

DESCRIPTION OF DRAWINGS

The accompanying drawings, which are incorporated in and constitute apart of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

A system and method is described herein, to manage highly-volatile statistics efficiently without synchronization, particularly in a high-performance multi-threaded application of a database management system or other computing environment. In some implementations, the system and method are linearly scalable across cores, as well as extremely fast, and can be used for separate statistics for each individual micro-operation of a multi-threaded operation.

Figure 1:
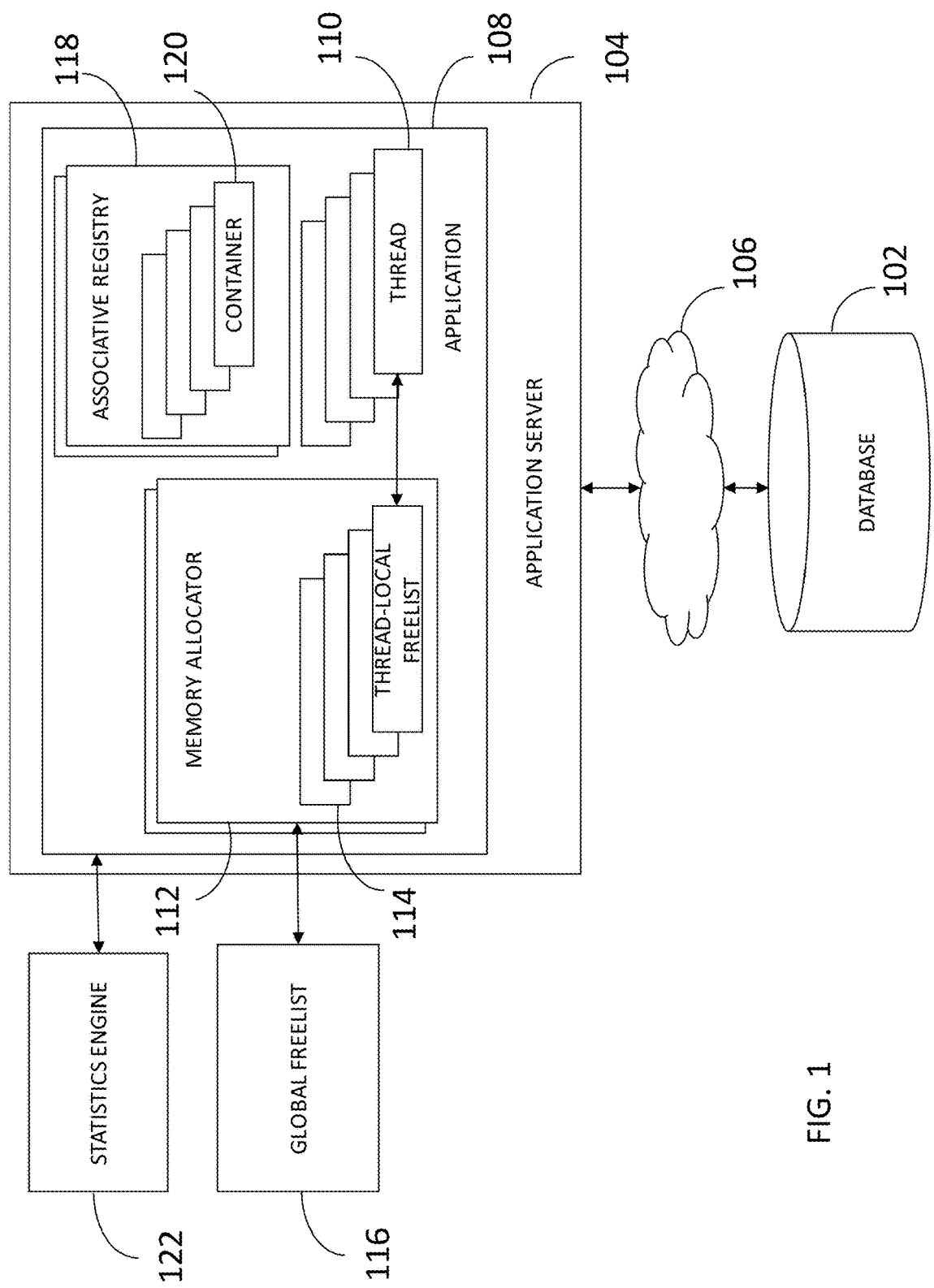
FIG. 1 shows a diagram illustrating aspects of a system showing features consistent with implementations of the current subject matter.

FIG. 1 depicts a computing system 100 that can implement the presently disclosed system and method. The computing system 100 includes a database 102 or other memory structure. The database 102 can be part of an in-memory, column-oriented, relational database management system (DBS) developed and marketed by SAP SE, for example. The database 102 can store and retrieve data as requested by applications that are allowed access to the database 102. In addition, the database 102, as part of a DBS, can perform advanced analytics (predictive analytics, spatial data processing, text analytics, text search, streaming analytics, graph data processing) and includes extract, transform, load (ETL) capabilities.

The system 100 can further include an application server 104, which can communicate with the database 102 directly or via a communication network 106. The communication network 106 can include any number of networks and computing nodes, and can also be referred to herein as the "cloud." The application server 104 executes an application 108 using data stored in the database 102. The application 108 can have one or more executable threads 110, where each thread executes and/or processes a portion of the application 108.

The application 108 of the application server 104 of the system 100 can further include a high-performance memory allocator 112, which includes one or more thread-local freelists 114 for allocating memory blocks to a corresponding one or more threads 110 based on a thread's need for memory. The memory allocator 112 further includes a global freelist 116. The memory allocator 112, thread-local freelist 114, and global freelist 116, and their operation, are described in further detail below.

In accordance with some implementations, the system 100 can include an associative registry 118, as described herein. The associative registry 118 can include one or more containers 120 for storing objects or references to objects. The associative registry 118 can be configured for managing highly-volatile registration/deregistration of objects without synchronization, but also for being able to enumerate these objects externally from the system 100. The system 100 can further include a statistics engine 122, in communication with (i.e. wrapped in) the associative registry 118, for managing highly-volatile statistics efficiently without synchronization, as further described herein.

A system and method to manage highly-volatile statistics includes the following aspects:

Data Structure

Similar to an associative registry, each statistics object to be registered is prefixed with a header structure containing:

```
struct stat_header
{
    atom owner_id;
    int version = 0;
};
```

The owner_id is used to discriminate among containers using some suitable fixed-size structure, such as a numeric ID, a GUID, and/or the like, since statistics need to be stored in various statistics containers. In some preferred exemplary implementations, the identifier of these containers can be referred to as an "atom," which is a storage entity storing alphanumeric strings of up to 20 characters in 128 bits. A version counter is then used to resolve a dirty read during reading. The version counter is initialized to zero for new objects, where even version numbers indicate an invalid object, and odd version numbers indicate a valid object, as understood by the computing system.

There may be several size classes of objects (e.g., 128B, 256B, 512B, . . . ). In some implementations, all objects of a single-sized class are allocated using a single high-performance allocator, and the contents of which are incorporated herein for all purposes. Accordingly, in some implementations, there is one global high-performance allocator for each size class. The high-performance allocator is further wrapped in an associative registry for each size class i.e., there is one corresponding associative registry for each size class, allocating objects using respective high-performance allocator. Objects of a certain size are then allocated using the associative registry, which can allocate smallest objects of size greater than or equal to the needed object size.

A statistics root for a concrete statistics class is described by its identifier (ID), and by a hierarchy of objects, as exemplified by the following:

```
struct statistics
{
    atom owner_id;
    statistics* parent;
    statistics* children;
    statistics* sibling;
    associative_registry* allocator;
};
```

The hierarchy support is needed to express derived statistics. For example, there might be a statistics class for message input/output (I/O) operations, which counts sends/receives and a derived class for network message I/O, which counts additionally network errors and retransmits. A user querying the statistics might be interested in all message I/O objects, thus querying the parent statistics and all associated child statistics, or other particular, more detailed statistics for a particular type of I/O object. This can be expressed easily with the defined hierarchy. All derived statistics can be stored as a linked list under a child link of the statistics, which can also be linked together via sibling link. The parent of the statistics is stored in the parent link, which may be null if there is no parent, i.e., top-level statistics. In other implementations, for example, a vector of children statistics can be used instead of a sibling link.

New Object Allocation

Statistics object allocation is similar to allocating an object by an associative registry, but with the addition of setting an owner identifier, or owner_id. When a new object is allocated, it is first allocated by an underlying high-performance allocator. This either allocates an already-existing object for reuse, or allocates a completely new object. For the sake of simplicity, it can be assumed that deallocation and reallocation of the object frame by the allocator does not destroy the object header and that the allocation of a new object frame initializes it to zero. Both can be trivially implemented in the high-performance allocator.

After the new statistics object is allocated, it is constructed using its usual constructor in the object frame just after the object header. Then, the object header is initialized as follows: the owner_id is set to the identification of the owner of the object (statistics container ID); a store/store memory barrier is executed, to ensure validity of the data in other threads, and a version, which is even at allocation time (marking the object as "invalid"), is incremented by one, making it odd, i.e., marking the object as "valid." After the header is initialized, the statistics object allocation is complete and the statistics object can be used.

Object Deallocation

Statistics object deallocation is the same as in the associative registry.

The object frame is deallocated via the underlying allocator. To do so, the following operations are performed by the computing system: the version of the object is incremented by one, setting it to even to indicate an invalid object; the store/store memory barrier is executed, to ensure validity of the data in other threads; an object destructor runs destroying the object; and the object frame is deallocated using the underlying high-performance allocator. The object destructor can be any conventional object destructor.

Object Enumeration

Object enumeration uses the enumerator of the associative registry. Since it is a rare operation, it does not have to be optimized for speed. Nevertheless, associative registry enumeration does not block normal operation of statistics object creation and deletion. In some implementations of an associative registry, the underlying allocator can enumerate existing object frames belonging to the allocator. This can be implemented in the high-performance allocator. When querying a statistics object, i.e., enumerating a statistics object, a user can select which statistics to read, and whether only this type or also all derived types are to be read from the database by the computer.

This can be expressed in pseudo-code as the following, however note that set<T> denotes a unique set of values of type T, such as a standard implementation std::set<T> in C++ standard library, and inserting duplicates is a no-op:

```
void query statistics(statistics* root, bool recursive, callback cb)
{
  set<atom> id_set;
  set<associative_registry*> registry_set;
  collect_statistics(id_set, registry_set, root, recursive);
  do_query(id_set, registry_set, cb);
}
void collect_statistics(set<atom>& id_set, set<associative_registry*>&
registry_set, statistic* stat, bool recursive)
{
  id_set.insert(stat->owner_id);
  registry_set.insert(stat->allocator);
  if (recursive) {
    statistics* child = stat->children;
    while (child) {
      collect_statistics(id_set, query_allocator, child, true);
      child =child->sibling;
    }
  }
}
```

After statistics to be queried, and the registries containing those statistics, are collected, the actual query can be started by enumerating all objects in those allocators, as follows:

```
void do_query(set<atom>& id_set, set<associative_registry*>&
registry_set, callback cb)
{
  for (associative_registry* reg : registry_set) {
    reg->enumerate_objects(
      [&](object* obj) {
        if (id_set.contains(obj->owner_id))
          callback(obj);
      }
    );
  }
}
```

A callback function can then copy data safely in a process, e.g., by materializing values as a row in a monitoring view of the database.

Figure 2:
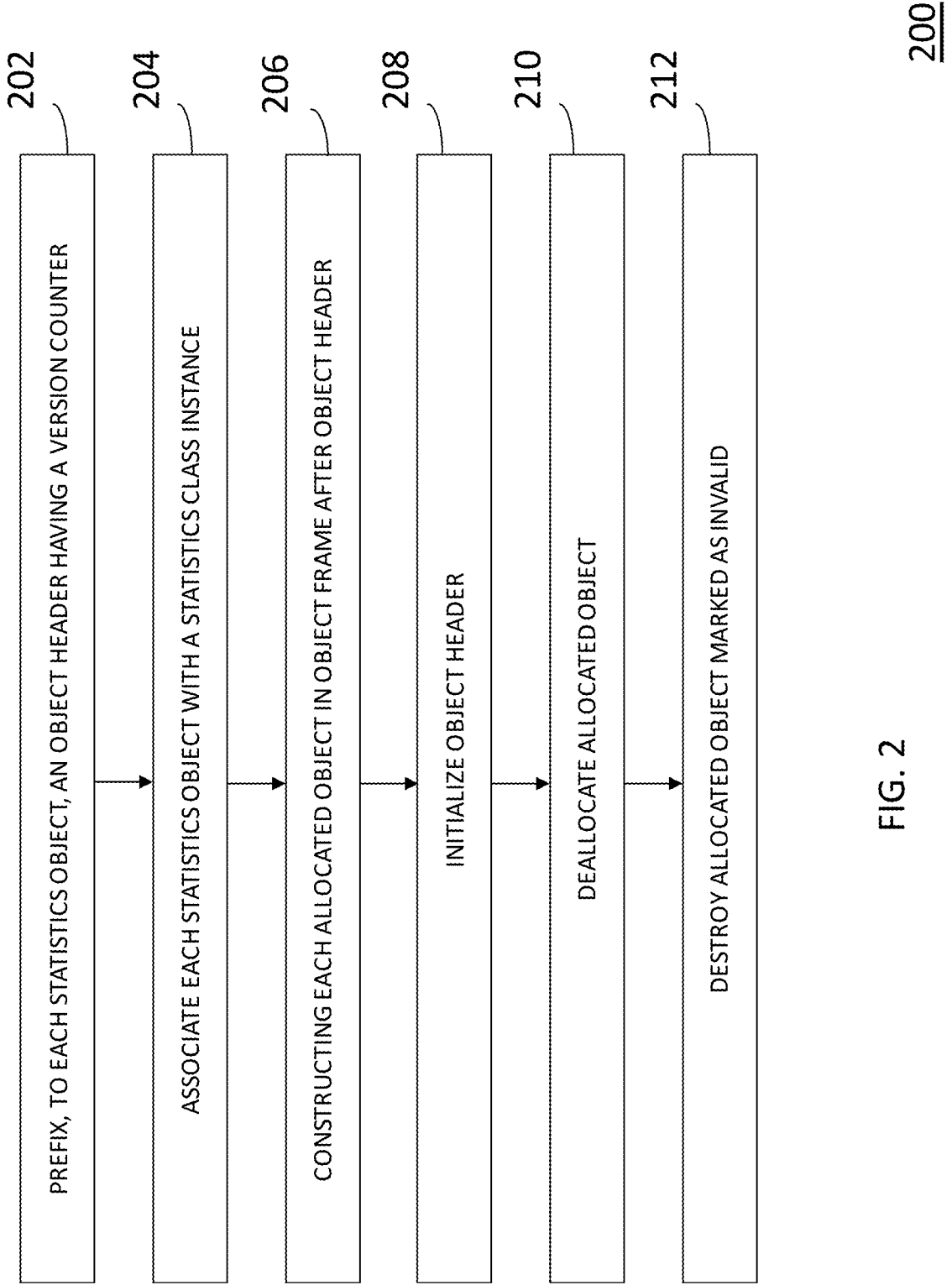
FIG. 2 shows a process flow diagram illustrating aspects of a method having one or more features consistent with implementations of the current subject matter.

FIG. 2 is a flowchart of a method 200 of managing highly-volatile statistics of a multi-threaded application environment, such as is illustrated in FIG. 1. The statistics can be represented by one or more statistics objects. At 202, each statistics object of the one or more statistics objects is prefixed an object header having a version counter with an initial version count of zero. At 204, each statistics object is associated with a statistics class instance. Each statistics class instance is also associated with an associative registry that is configured to allocate smallest possible objects of a size equal to or greater than to that of the statistics objects, the registry segmenting the statistics objects according to a size class. At 206, each allocated statistics object is constructed in the object frame after the object header, and at 208 the object header of each allocated statistics object is initialized by executing a store/store memory barrier and incrementing the version counter by a count of one to mark the associated allocated statistics object as valid. At 210, an allocated statistics object can be deallocated by incrementing the version counter by a count of one to mark the associated valid allocated object as invalid, and at 212, the allocated statistics object marked as invalid can be destroyed.

One or more aspects or features of the subject matter described herein can be realized in digital electronic circuitry, integrated circuitry, specially designed application specific integrated circuits (ASICs), field programmable gate arrays (FPGAs) computer, hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method of managing highly-volatile statistics of a multi-threaded application environment, the statistics being represented by one or more statistics objects, the method comprising:
   prefixing, to each statistics object of the one or more statistics objects, an object header having an owner identifier to identify an owner of the corresponding statistics object and a version counter with an initial version count of zero to indicate a new statistical object, wherein an even version count indicates an invalid statistical object and an odd version count indicates a valid statistical object;
   associating each statistics object with a statistics class instance, each statistics class instance being associated with an associative registry that is configured to allocate smallest possible objects of a size equal to or greater than to that of the one or more statistics objects, the associative registry segmenting the statistics objects according to a size class;
   constructing each allocated statistics object in the object frame after the object header; and
   initializing the object header of each allocated statistics object by executing a store/store memory barrier and incrementing the version counter by a count of one to mark the associated allocated statistics object as valid.

2. The method in accordance with claim 1, further comprising:
   deallocating an allocated statistics object by incrementing the version counter by a count of one to mark the associated valid allocated object as invalid; and
   destroying the allocated statistics object marked as invalid.

3. The method in accordance with claim 1, further comprising:
   for each statistics object to be allocated to a thread of the multi-threaded application environment, allocating an object frame associated with each allocated object to the thread while maintaining the object header.

4. The method in accordance with claim 1, further comprising enumerating, by an associative registry, each statistics object for later querying.

5. The method in accordance with claim 1, wherein the statistics class instance is provided in a hierarchy that is configured to expressed derived statistics.

6. A system for allocating memory to a thread of a multi-threaded program, the system comprising:
   a programmable processor; and
   a machine-readable medium storing instructions that, when executed by the processor, cause the at least one programmable processor to perform operations comprising:
   prefix, to each statistics object of the one or more statistics objects, an object header having an owner identifier to identify an owner of the corresponding statistics object and a version counter with an initial version count of zero to indicate a new statistical object, wherein an even version count indicates an invalid statistical object and an odd version count indicates a valid statistical object;

associate each statistics object with a statistics class instance, each statistics class instance being associated with an associative registry that is configured to allocate smallest possible objects of a size equal to or greater than to that of the one or more statistics objects, the associative registry segmenting the statistics objects according to a size class;

construct each allocated statistics object in the object frame after the object header; and initialize the object header of each allocated statistics object by executing a store/store memory barrier and incrementing the version counter by a count of one to mark the associated allocated statistics object as valid.

7. The system in accordance with claim 6, wherein the operations further comprise operations to:

deallocate an allocated statistics object by incrementing the version counter by a count of one to mark the associated valid allocated object as invalid; and destroy the allocated statistics object marked as invalid.

8. The system in accordance with claim 6, wherein the operations further comprise an operation to, for each statistics object to be allocated to a thread of the multi-threaded application environment, allocate an object frame associated with each allocated object to the thread while maintaining the object header.

9. The system in accordance with claim 6, wherein the operations further comprise an operation to enumerate, by an associative registry, each statistics object for later querying.

10. The system in accordance with claim 6, wherein the statistics class instance is provided in a hierarchy that is configured to expressed derived statistics.

11. A computer program product comprising a non-transitory machine-readable medium storing instructions that, when executed by at least one programmable processor, cause the at least one programmable processor to perform operations comprising:

prefix, to each statistics object of the one or more statistics objects, an object header having an owner identifier to identify an owner of the corresponding statistics object and a version counter with an initial version count of zero to indicate a new statistical object, wherein an even version count indicates an invalid statistical object and an odd version count indicates a valid statistical object;

associate each statistics object with a statistics class instance, each statistics class instance being associated with an associative registry that is configured to allocate smallest possible objects of a size equal to or greater than to that of the one or more statistics objects, the associative registry segmenting the statistics objects according to a size class;

construct each allocated statistics object in the object frame after the object header; and initialize the object header of each allocated statistics object by executing a store/store memory barrier and incrementing the version counter by a count of one to mark the associated allocated statistics object as valid.

12. The computer program product in accordance with claim 11, wherein the operations further comprise operations to:

deallocate an allocated statistics object by incrementing the version counter by a count of one to mark the associated valid allocated object as invalid; and destroy the allocated statistics object marked as invalid.

13. The computer program product in accordance with claim 11, wherein the operations further comprise an operation to, for each statistics object to be allocated to a thread of the multi-threaded application environment, allocate an object frame associated with each allocated object to the thread while maintaining the object header.

14. The computer program product in accordance with claim 11, wherein the operations further comprise an operation to enumerate, by an associative registry, each statistics object for later querying.

15. The computer program product in accordance with claim 11, wherein the statistics class instance is provided in a hierarchy that is configured to expressed derived statistics.

* * * * *